Patented July 3, 1951

2,558,882

UNITED STATES PATENT OFFICE 2,558,882

HYDROCARBON COMPOSITIONS

Louis Schmerling, Riverside, Ill., assignor to Universal Oil Products Company, Chicago, Ill., a corporation of Delaware No Drawing. Application November 29, 1946, Serial No. 713,075

4 Claims. (Cl. 260—33.6)

This invention relates to hydrocarbon compositions. It is more particularly concerned with a method of modifying at least one of the physical properties of petrolatum-like hydrocarbons.

In one embodiment my invention relates to a composition comprising a petrolatum-like hydrocarbon containing a minor amount of a certain type of ethylene polymer dissolved therein.

In another embodiment it relates to a composition comprising a petrolatum-like cycloalkylpolyethylene containing a minor amount of the ethylene polymer dissolved therein.

In a more specific embodiment my invention relates to a process of modifying a petrolatum-like polyethylene which comprises heating a petrolatum-like hydrocarbon to liquefy the same, dissolving a minor proportion of the ethylene polymer therein, and cooling the resultant solution to solidify the same.

Good yields of polyethylene are obtained by polymerizing ethylene at moderate pressures in the presence of peroxide catalysts and saturated hydrocarbons containing three or more carbon atoms. By varying the operating conditions in this process, it is possible to obtain a product which is either a viscous liquid or a semisolid at room temperature. These products are substantially saturated and noncrystalline and closely resemble amorphous waxes or petrolatum-like hydrocarbons. Occasionally it is desirable to modify the stiffness, hardness, melting point, expansion coefficient, rubbing characteristics, or other physical properties of these polymers. I have found a simple and inexpensive method of accomplishing such modifications. My method comprises heating the petrolatum-like polyethylene to a temperature sufficient to liquefy it, dissolving a minor amount of a modifying agent therein, and cooling the resultant solution to solidify the same, said modifying agent being the tough, flexible, solid polymer of ethylene, suitable for use in plastics, produced by the polymerization of ethylene at high pressures. The molecular weight of this material usually lies within the range of from 10,000 to 30,000.

I have found that when a cycloparaffin is used as the saturated hydrocarbon diluent in the peroxide polymerization of ethylene, the product consists chiefly of cycloalkylpolyethylenes, i. e., long chain alkyl naphthenes. For example, in one experiment in which ethylene was polymerized at 115° C. and 40 atmospheres pressure in the presence of methylcyclohexane and tertiary butyl perbenzoate, the product was shown to have an average composition corresponding to one molecule of methylcyclohexane associated with 12–14 molecules of ethylene. The product was a soft grease-like material having the consistency of the marketed petrolatum commonly known as "Vaseline." It was shown that the physical properties of this new type of polyethylene can be altered by the dissolution therein of a modifying agent as above described.

The following examples are given to illustrate my invention but they are not introduced with the intention of unduly limiting the generally broad scope of said invention.

Example I

A grease-like cycloalkylpolyethylene was produced by charging to a rotating autoclave, fitted with a glass liner, 3 grams of tertiary butyl perbenzoate, 50 grams of methylcyclohexane, and 40 atmospheres of initial ethylene pressure, rotating the autoclave for 4 hours at 115° C., and cooling and recovering the product.

Ten grams of the cycloalkylpolyethylene thus produced was heated with 1 gram of solid ethylene polymer to 105° C. at which temperature the last mentioned material dissolved in the polyethylene and yielded a clear viscous solution which became solid upon cooling. The melting point of the cycloalkylpolyethylene was 80° C.; whereas the melting point of the solution was 92° C. Thus an exceedingly disproportionate increase in melting point was obtained since the modifying agent had a melting point of 104° C. In addition, the solid solution had the consistency of hard wax in contrast to the grease-like consistency of the cycloalkylpolyethylene.

Another 10 gram portion of the cycloalkylpolyethylene was heated to a temperature of 105° C. and 3 grams of solid ethylene polymer was then dissolved therein. The cooled, solidified solution had a melting point of 96° C. and was somewhat harder than the solution containing 1 gram of the modifying agent. These and other data show that the greatest benefit is derived from the addition of a solid ethylene polymer to petrolatum-like hydrocarbons, particularly cycloalkylpolyethylenes, when the concentration of the additive is less than the concentration of the other hydrocarbon.

Example II

Ethylene was polymerized in accordance with the procedure outlined under Example I except that the temperature was 200° C. instead of 115° C. In this case the cycloalkylpolyethylene was a viscous liquid instead of a grease-like solid.

When 1 gram of solid ethylene polymer was dissolved in the liquid product by heating followed by cooling, a solid with a melting point of 86° C. was produced. When 3 grams of solid ethylene polymer was dissolved in 10 grams of liquid, the melting point of the resultant solution was 95° C.

I claim as my invention:

1. As a composition of matter, a petrolatum-like cycloalkylpolyethylene having dissolved therein a minor proportion of a solid ethylene polymer having a molecular weight of from 10,000 to 30,000, said polymer being present in sufficient amount to increase the melting point of the cycloalkylpolyethylene.

2. As a composition of matter, a petrolatum-like cycloalkylpolyethylene having dissolved therein from about 10% to about 30% by weight of a solid ethylene polymer having a molecular weight of from 10,000 to 30,000.

3. A process which comprises heating a petrolatum-like cycloalkylpolyethylene to liquefying temperature, dissolving therein a minor proportion, sufficient to increase the melting point of the cycloalkylpolyethylene, of a solid ethylene polymer having a molecular weight of from 10,000 to 30,000, and cooling the resultant solution to solidify the same.

4. A process which comprises heating a petrolatum-like cycloalkylpolyethylene to liquefying temperature, dissolving therein from about 10% to about 30% by weight of a solid ethylene polymer having a molecular weight of from 10,000 to 30,000, and cooling the resultant solution to solidify the same.

LOUIS SCHMERLING.

REFERENCES CITED

The following references are of record in the file of this patent:

UNITED STATES PATENTS

| Number | Name | Date |
| --- | --- | --- |
| 2,212,155 | Ellis | Aug. 20, 1940 |
| 2,298,846 | Skooglund | Oct. 13, 1942 |
| 2,395,381 | Squires | Feb. 19, 1946 |
| 2,396,677 | Brubaker | Mar. 19, 1946 |
| 2,467,245 | Whitman et al. | Apr. 12, 1949 |

OTHER REFERENCES

Ind. and Eng. Chem., June 1945, p. 526.
British Plastics (1), May 1945, pp. 213-214.
British Plastics (2), Dec. 1943, pp. 417-418.